UNITED STATES PATENT OFFICE.

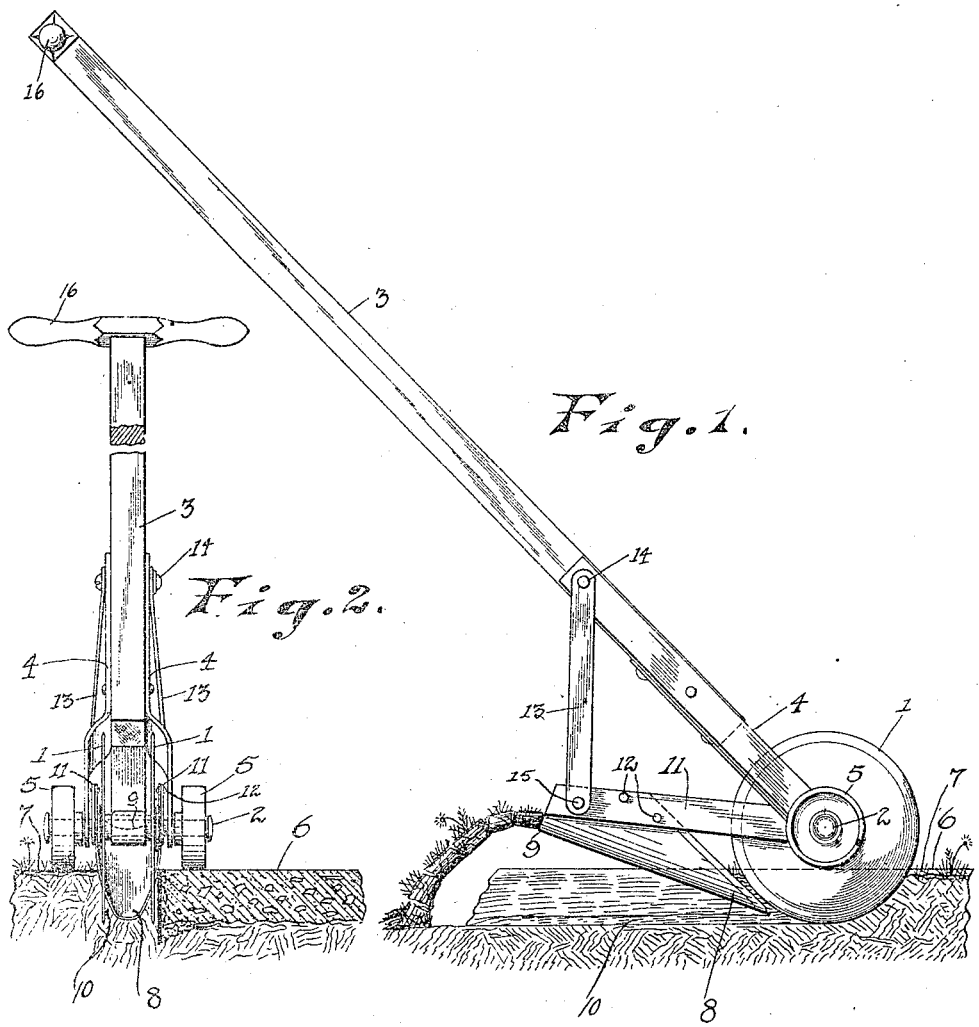

CHARLES KARASS, OF MILWAUKEE, WISCONSIN.

LAWN-EDGE TRIMMER.

1,006,758. Specification of Letters Patent. Patented Oct. 24, 1911.

Application filed May 5, 1911. Serial No. 625,228.

*To all whom it may concern:*

Be it known that I, CHARLES KARASS, a citizen of the United States, residing at Milwaukee, county of Milwaukee, and State of Wisconsin, have invented new and useful Improvements in Lawn-Edge Trimmers, of which the following is a specification.

My invention relates to improvements in lawn edge trimmers.

The object of my invention is to provide a device for simultaneously cutting and removing a narrow strip of sod and grass along the edge of a walk or pavement, whereby the grass is prevented from growing over and upon the edge of such walk and pavement, and whereby the same is given a neat and attractive appearance.

My invention is further explained by reference to the accompanying drawings in which—

Figure 1 represents a side view thereof, and Fig. 2 represents an end view.

Like parts are identified by the same reference numerals throughout the several views.

My device comprises, among other things, two circular disk blades 1, 1 which are rigidly fixed to and revolve with the shaft 2, and the shaft 2 is revolubly connected with an operating handle 3, by the side straps 4, 4. The shaft 2 is provided upon its respective ends with independently revolving wheels 5, 5, one of which when in use, is adapted to roll upon the upper surface of the sidewalk or pavement 6, while the other is adapted to roll upon the surface of the lawn 7. The wheels 5 serve to support the trimming device and limit the depth to which the disk blades 1 shall penetrate the surface of the ground. 8 is a scoop or elevating blade which is preferably U-shaped in cross section, as shown in Fig. 2, and its front end is adapted to penetrate the ground in rear of the cutting blades 1, whereby the sod and soil which has been severed upon its respective sides by the cutting blades, is scooped up and discharged over the rear end 9 of said scoop, as indicated in Fig. 1. The distance between the blades 1, 1 determines the width of the groove 10, which is formed in the sod at the marginal edge of the walk or pavement, and the width of the groove is such as to prevent the grass from growing over the edge of the walk or pavement. The scoop 8 is connected with the shaft 1 by the side bars 11, the front end of said side bars being provided with an aperture for the reception of said shaft, while the rear ends of said side bars are connected with the scoop by a plurality of rivets 12. The rear ends of said scoop 8 and side bars 11 are connected with the handle 3 by the straps 13, and said straps are in turn connected at their upper ends with the handle by nails 14, and at their lower ends to said straps 13 by the rivets 15. The upper end of the handle 3 is preferably provided with a cross bar 16 for convenience in operating the device.

Having thus described my invention, what I claim as new and desire to secure by Letters Patent, is:—

In a device of the described class, the combination of an operating handle, a shaft, a pair of disk blades supported on said shaft, a scoop centrally supported between said disk blades from said shaft and handle, and a pair of wheels respectively supported on the respective ends of said shaft, said scoop being adapted to elevate the sod severed on its respective sides by said disk blades, and said wheels being adapted to limit the cutting depth of said blades, all substantially as and for the purpose specified.

In testimony whereof I affix my signature in the presence of two witnesses.

CHARLES KARASS.

Witnesses:
JAS. B. ERWIN,
I. D. BREMER.